(12) United States Patent  (10) Patent No.: US 7,948,669 B1
Karras et al.  (45) Date of Patent: May 24, 2011

(54) METHODS OF OPTIMIZING SPUR-FREE DYNAMIC RANGE OR GAIN IN ELECTRO-ABSORPTION MODULATORS

(75) Inventors: Thomas W. Karras, Berwyn, PA (US); David L. Enlow, Trooper, PA (US); Paul Kit Lai Yu, San Diego, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 232 days.

(21) Appl. No.: 12/432,604

(22) Filed: Apr. 29, 2009

Related U.S. Application Data

(60) Provisional application No. 61/049,386, filed on Apr. 30, 2008.

(51) Int. Cl.
  *G02F 1/03* (2006.01)
(52) U.S. Cl. ............ 359/248; 359/240; 359/245; 385/2; 385/30; 372/26; 372/29.02; 257/21
(58) Field of Classification Search .................. 359/240, 359/245, 248; 385/1–5, 8, 10, 30, 131; 372/10, 372/26, 29, 34, 38, 50.122, 50.22; 257/14, 257/17, 21, 22, 30, 96, 98, 184, 188, 189
See application file for complete search history.

(56) References Cited

U.S. PATENT DOCUMENTS

| | | | | |
|---|---|---|---|---|
| 5,151,915 A | * | 9/1992 | Paoli | 372/50.122 |
| 5,267,255 A | * | 11/1993 | Paoli | 372/50.22 |
| 5,680,411 A | * | 10/1997 | Ramdane et al. | 372/50.1 |
| 6,661,556 B2 | * | 12/2003 | Bond et al. | 359/245 |
| 6,844,954 B2 | * | 1/2005 | Bond et al. | 359/240 |
| 6,897,993 B2 | * | 5/2005 | Steinle | 359/240 |
| 7,167,605 B2 | | 1/2007 | Chang et al. | |

OTHER PUBLICATIONS

Zhuang, et al., "Peripheral-Coupled-Waveguide MQW Electroabsorption Modulator for Near Transparency and High Spurious Free Dynamic Range RF Fiber-Optic Link," IEEE Photonics Technology Letters, Sep. 2004, pp. 2033-2035, vol. 16, No. 9, IEEE.

* cited by examiner

*Primary Examiner* — Loha Ben
(74) *Attorney, Agent, or Firm* — McDermott Will & Emery LLP

(57) ABSTRACT

Exemplary methods of maximizing a spur-free dynamic range (SFDR) or a gain of an electro-absorption modulator (EAM) are disclosed. At least one parameter in a set of design parameters for an EAM is varied. An SFDR of the EAM is determined in part by a first set of design parameters. A gain of the EAM is determined in part by a second set of design parameters. An output versus bias voltage transfer curve of the EAM is generated. An optimal SFDR bias voltage at which a maximum SFDR occurs for a given optical input power or an optimal gain bias voltage at which a maximum gain occurs for a given optical input power is programmatically determined based at least in part on the transfer curve.

20 Claims, 8 Drawing Sheets

US 7,948,669 B1

METHODS OF OPTIMIZING SPUR-FREE DYNAMIC RANGE OR GAIN IN ELECTRO-ABSORPTION MODULATORS

CROSS-REFERENCES TO RELATED APPLICATIONS

The present application claims the benefit of U.S. Provisional Patent Application Ser. No. 61/049,386, entitled "HIGH SPUR FREE DYNAMIC RANGE ELECTRO-ABSORPTION MODULATOR," filed on Apr. 30, 2008, which is hereby incorporated by reference in its entirety for all purposes.

STATEMENT REGARDING FEDERALLY SPONSORED RESEARCH OR DEVELOPMENT

The invention was made with Government support, and the Government has certain rights in the invention by the terms of Contract No. F33615-01-2-1843 awarded by the Air Force Research Laboratory (AFRL) of the United States Air Force (USAF).

BACKGROUND

1. Field

The subject technology relates generally to electro-absorption modulators (EAMs), and more specifically to methods for optimizing a spur-free dynamic range (SFDR) or a gain in EAMs.

2. Background

An electroabsorption modulator (EAM) is a popular choice for high speed optical modulation due to its small size, high slope efficiency, large modulation bandwidth, and potential for monolithic integration with other optical and electrical components. In order to be compatible with input and output optical fibers, the EAM typically comprises an optical waveguide structure for optical confinement.

The EAM operates via an electric field induced change in the absorption spectrum of an electroabsorption (EA) material of the EAM. In some EAMs, the EA material is an integral part of the optical waveguide. In peripheral coupled waveguide (PCW) EAMs, however, an EA layer comprising the EA material is decoupled from the optical waveguide of the EAM. For example, the EA layer is placed above the waveguide layer and peripheral to an optical waveguide mode, in its evanescent or peripheral field. The low confinement factor in the EA layer (typically below 10%) enhances the optical power handling capability of the EAM by reducing the photogeneratated current. The PCW EAM can have either a lumped electrode configuration or a travelling-wave electrode configuration.

An SFDR and a gain are two important link parameters for evaluating the performance of an EAM. The latter measures the effectiveness of the EAM to transfer the optical input power to the optical output power, while the former measures the ratio of the RMS value of the fundamental response to a next largest noise or harmonic distortion (e.g., intermodulation distortion).

SUMMARY

According to various aspects of the present disclosure, methods for designing an EAM in which the SFDR or the gain is maximized based at least in part on an output versus bias voltage transfer curve that is experimentally obtained from an EAM sample. This approach provides a reliable and efficient method of optimizing an EAM design for either a maximum SFDR or a maximum gain depending on which link parameter is sought to be maximized.

In one aspect of the disclosure, a method of maximizing a spur-free dynamic range (SFDR) or a gain of an electro-absorption modulator (EAM) is disclosed. The method can comprise varying at least one parameter in a set of design parameters for an EAM. An SFDR of the EAM can be determined in part by the set of design parameters. A gain of the EAM can be determined in part by the set of design parameters. The method can further comprise generating an output versus bias voltage transfer curve of the EAM. The method can further comprise programmatically determining an optimal SFDR bias voltage at which a maximum SFDR occurs for an optical input power or an optimal gain bias voltage at which a maximum gain occurs for an optical input power based at least in part on the transfer curve.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology Like components are labeled with identical element numbers for ease of understanding.

Figure 1:
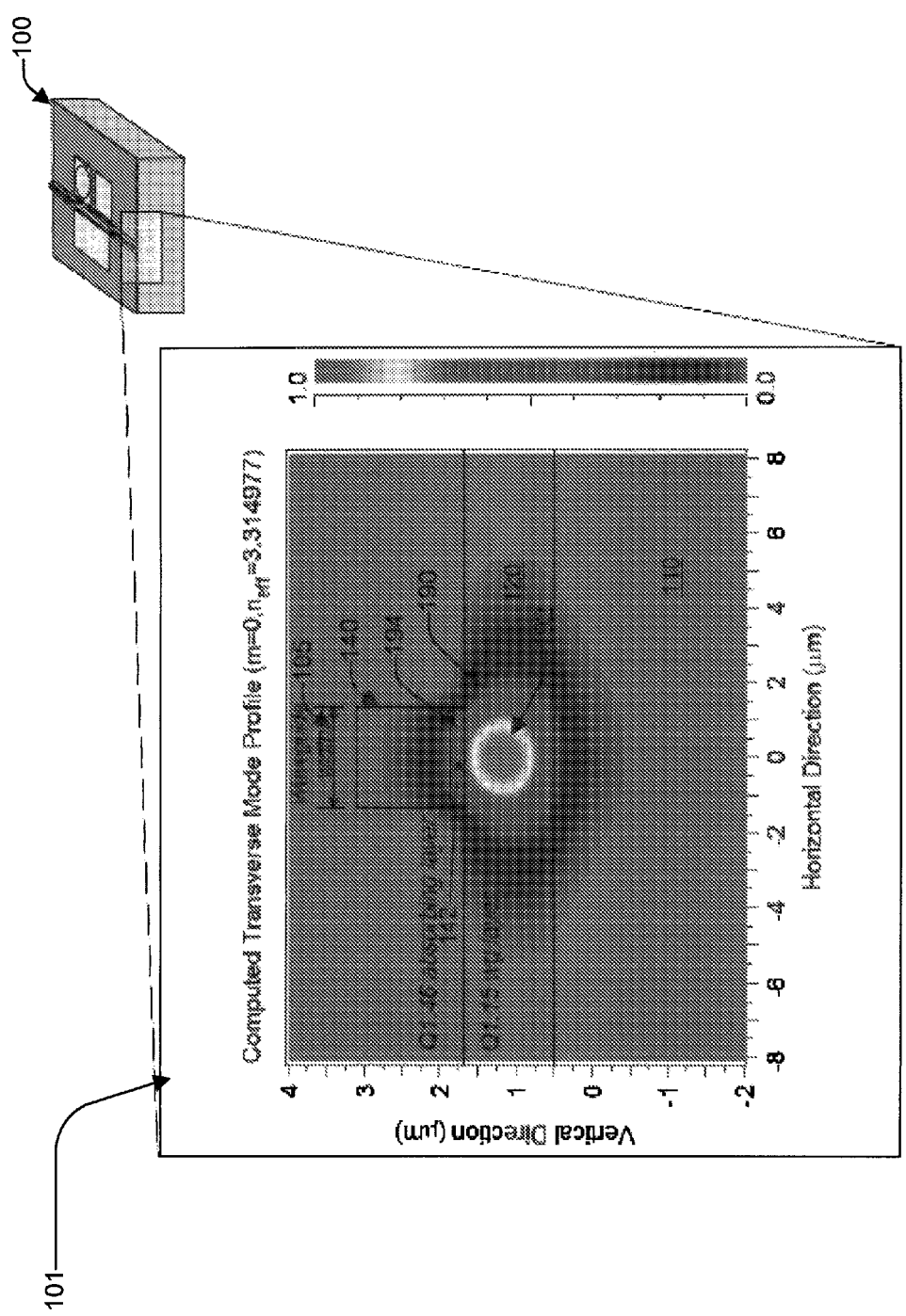
FIG. 1 shows a diagram illustrating an exemplary EAM that can be advantageously designed according to various methods of the present disclosure and a graph illustrating a computed transverse mode profile according to one aspect of the subject technology.
Figure 2:
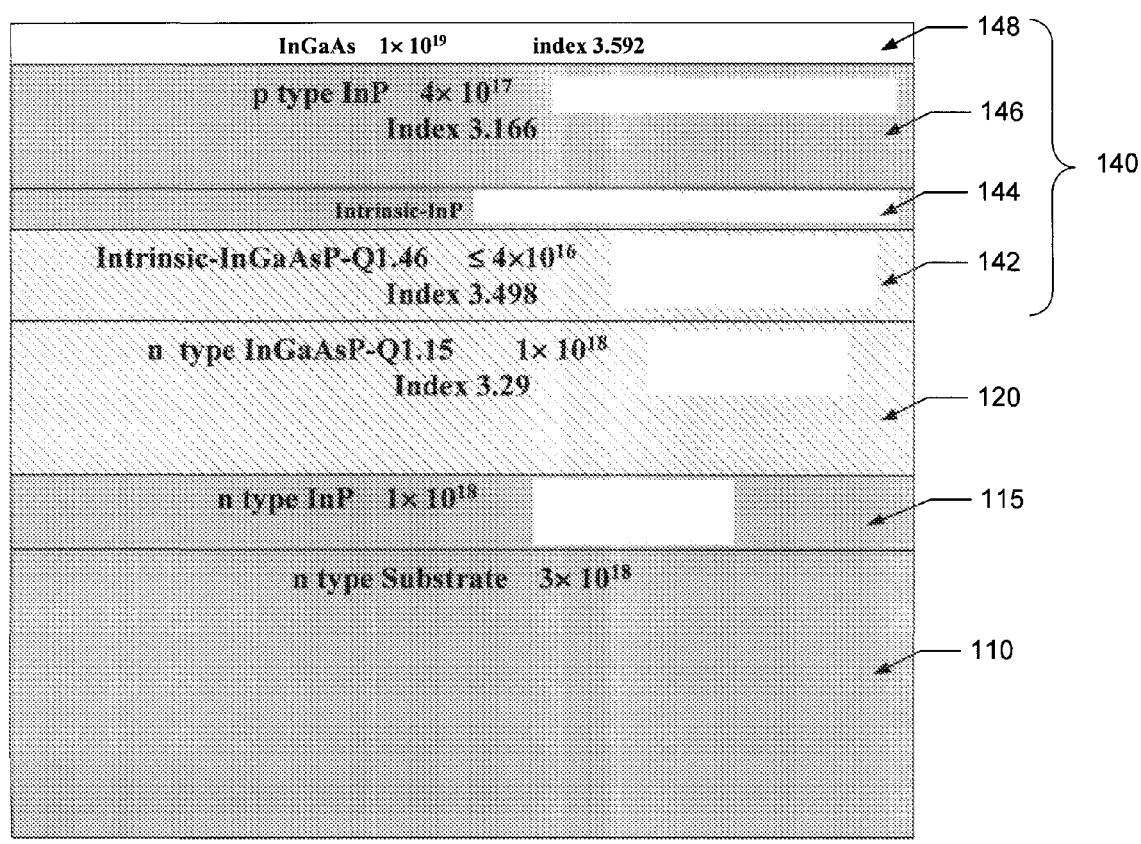
FIG. 2 is a diagram showing different layers of an EAM such as the EAM shown in FIG. 1 according to one aspect of the subject technology.

FIG. 1 shows a diagram illustrating an exemplary EAM 100 that can be advantageously designed according to various methods of the present disclosure and a graph 101 illustrating a computed transverse mode profile according to one aspect of the subject technology. FIG. 2 is a diagram showing different layers of an EAM such as the EAM 100 shown in FIG. 1 according to one aspect of the subject technology. In the illustrated example of FIG. 1, the EAM 100 includes a substrate 110, a waveguide layer 120 disposed above the substrate 110, and a ridge structure 140 having a waveguide width 105. The ridge structure 140 includes an electroabsorption (EA) layer 142. In the detailed layer structure shown in FIG. 2, additional layers of the EAM 100 are shown. For example, there is a lower confining (e.g., clad) layer 115 disposed between the substrate layer 110 and the waveguide layer 120, and the ridge structure 140 additionally includes a transition layer 144 disposed above the EA layer 142, an upper confining (e.g., clad) layer 146 disposed over the transition layer 144, and an electrode-bonding layer 148 disposed above the upper confining layer 146.

In the illustrated example of FIG. 2, the substrate 110 includes an n-type semiconductor (e.g., indium phosphide); the lower confining layer 115 includes an n-type indium phosphide (InP); the waveguide layer 120 includes an n-type indium gallium arsenide phosphide (InGaAsP); the EA layer 142 includes an intrinsic InGaAsP; the transition layer 144 includes an intrinsic InP; the upper confining layer 146 includes a p-type InP; and the electrode-bonding layer 148 includes a heavily-doped p-type InGaAs. Thicknesses of various layers constitute some of the design parameters that can be varied to change either SFDR or gain of the EAM device, and some examples of the layer thicknesses are provided with respect to different EAM embodiments discussed below.

It shall be appreciated by those skilled in the art in view of the present disclosure that the particular materials and/or dopants for the different layers discussed above are provided for the purpose of illustration only, and other types of materials and/or dopants may be employed without departing from the scope of the present disclosure. Furthermore, the particular layer stacking order for the different layers is also provided for the purpose of illustration only, and other layer stacking orders may be employed without departing from the scope of the present disclosure. For example, while a lumped-type PCW EAM may advantageously employ the layer stacking order described above, a travelling-wave-type PCW EAM may advantageously employ a different layer stacking order. For example, the upper confining layer 146 may be disposed below the EA layer 142 and directly above the waveguide layer 120 in the travelling-type PCW EAM. A multitude of other layer and material configurations are possible.

In one aspect of the present disclosure, the EA layer 142 can include a multiple quantum well material comprising a plurality of quantum wells. For example, the EA layer 142 may comprise an InGaAsP well and an InGaAsP barrier. In another aspect, the EA layer 142 can comprise a Franz-Keldysh effect material, e.g., InGaAsP having its bandgap tuned for a specific wavelength of the optical wave of interest.

The graph 101 of FIG. 1 also shows a profile of a transverse optical mode 190 comprising a mode core 192 and a mode peripheral field 194 surrounding the mode core 192. The mode core 192 is confined mostly or exclusively within the waveguide layer 120, while the mode peripheral field 194 extends out to and beyond the EA layer 142. For confinement of the optical mode 190, the waveguide layer 120 has a higher index of refraction than that of the lower and upper confining layers 115, 146. As the optical mode 190 shown in the graph 101 demonstrates, when guided in the optical waveguide comprising the waveguide layer 120 and the lower and upper confining layer 115, 146, an optical wave of interest (e.g., the optical mode 190) is primarily in the waveguide layer 120 in the form of the mode core 192, but it also extends into the ridge structure 140 including the EA layer 142 in the form of the mode peripheral field 194. As the optical properties (e.g., absorption index) of the EA layer 142 are changed by an electric field produced by a microwave/RF modulation voltage applied between the electrode-bonding layer 148 and an electrode placed below the substrate 110, for example, the changing optical properties of the EA layer 142 in turn affect the propagation of the optical wave in the optical waveguide through the mode peripheral field 194, thereby effectuating an optical modulation of the optical wave of interest by the microwave/RF modulation voltage.

Figure 3:
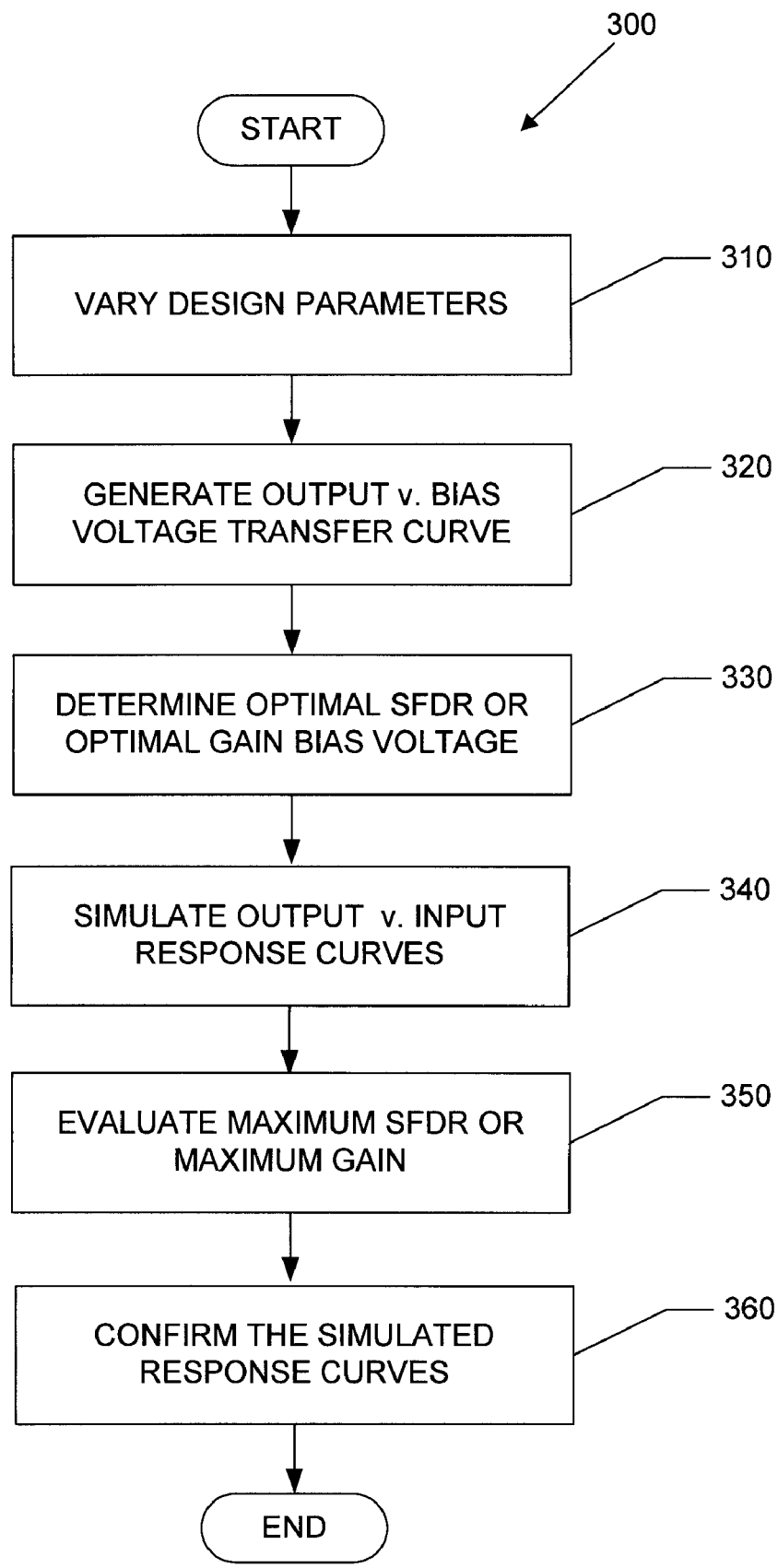
FIG. 3 is a flowchart illustrating an exemplary process for maximizing the SFDR or the gain of an EAM according to one aspect of the subject technology.

As discussed above, the SFDR and the gain are two important link parameters for evaluating the performance of an EAM. Therefore, it is desirable to be able to efficiently and accurately predict and optimize the performance of the EAM with respect to these link parameters at the design stage. FIG. 3 is a flowchart illustrating an exemplary process 300 for maximizing the SFDR or the gain of an EAM according to one aspect of the subject technology. For clarity, the process 100 is described with respect to the EAM 100 illustrated in FIGS. 1 and 2. The process 300 begins at a state 310, in which one or more parameters in a set of design parameters that are capable of changing either the SFDR or gain are varied. Such variations can include, inter alia, a change in the thickness of a waveguide layer 120, a change in the overall distance between two optical confining layers 115, 146, a change in the thickness of the EA layer 142, all of which may also contribute to a circularization of the optical mode 190 so as to improve the coupling of the optical mode 190 into input and output optical fibers, and an increase in the size of the optical mode 190 so as to increase the optical power handling capability of the EAM. Typically, this involves an increased layer thickness over that used in current commercial EAMs.

It is worth noting that at least some of these design parameters are interrelated. For example, as will be discussed with respect to various EAM embodiments below, an increase in the thickness of the waveguide layer 120 and/or the thickness of the EA layer 142 can result in a circularization and an increase in the size of the optical mode 190. Decisions regarding the design parameters to be varied and the magnitude of the variations may be made by a human (e.g., a design engineer) based on an analysis tool (e.g., a modeling program). Alternatively, the decisions may be programmatically made by an analysis program based on an input of certain design criteria such as size, optical power handling capability, linearity, and the like.

The process 300 proceeds to a state 320, in which an output (e.g. an optical output power) versus a bias voltage transfer curve is generated. As used herein, the term "bias voltage"

refers to a reverse or negative DC bias voltage applied between the electrode-bonding layer 148 and an electrode placed below the substrate 110. The generation of the transfer curve typically involves having a sample of an EAM built according to the design parameters variably selected at the state 310. The EAM sample can then be subjected to a computerized measurement process in which an optical input power of a preset magnitude (which itself can be one of the variable design parameters) is provided to the input of the EAM sample, and the optical output power is measured while a bias voltage provided to the electrode-bonding layer 148 is varied within a preset range (e.g., from 0 to −4V), depending on the tolerance of the EAM. The set of measured values of the optical output power so obtained constitutes the output versus bias voltage transfer curve for the EAM sample in one aspect of the subject technology. Optionally, several EAM samples may be built and measurements taken on the several EAM samples for an increase accuracy or attainment of a best sample among the several EAM samples. After generating the transfer curve, data representative of the transfer curve can be stored in a memory. The transfer curve may also be optionally displayed on a display for inspection or other use by the designer or a computer-controlled device.

The process 300 proceeds to a state 330, in which an optimal SFDR bias voltage or an optimal gain bias voltage is determined from that transfer curve using the model, depending on whether the SFDR or the gain is sought to be maximized. As used herein, the term "optimal SFDR bias voltage" refers to a bias voltage or a range of bias voltages provided to the EAM at which a maximum SFDR occurs for a given optical input power (e.g., the optical input power with which the transfer curve measurements were taken) occurs. Similarly, as used herein, the term "optimal gain bias voltage" refers to a bias voltage or a range of bias voltages provided to the EAM at which a maximum gain occurs for a given optical input power occurs. In general, the optimal SFDR bias voltage is different from the optimal gain bias voltage.

Figure 4:
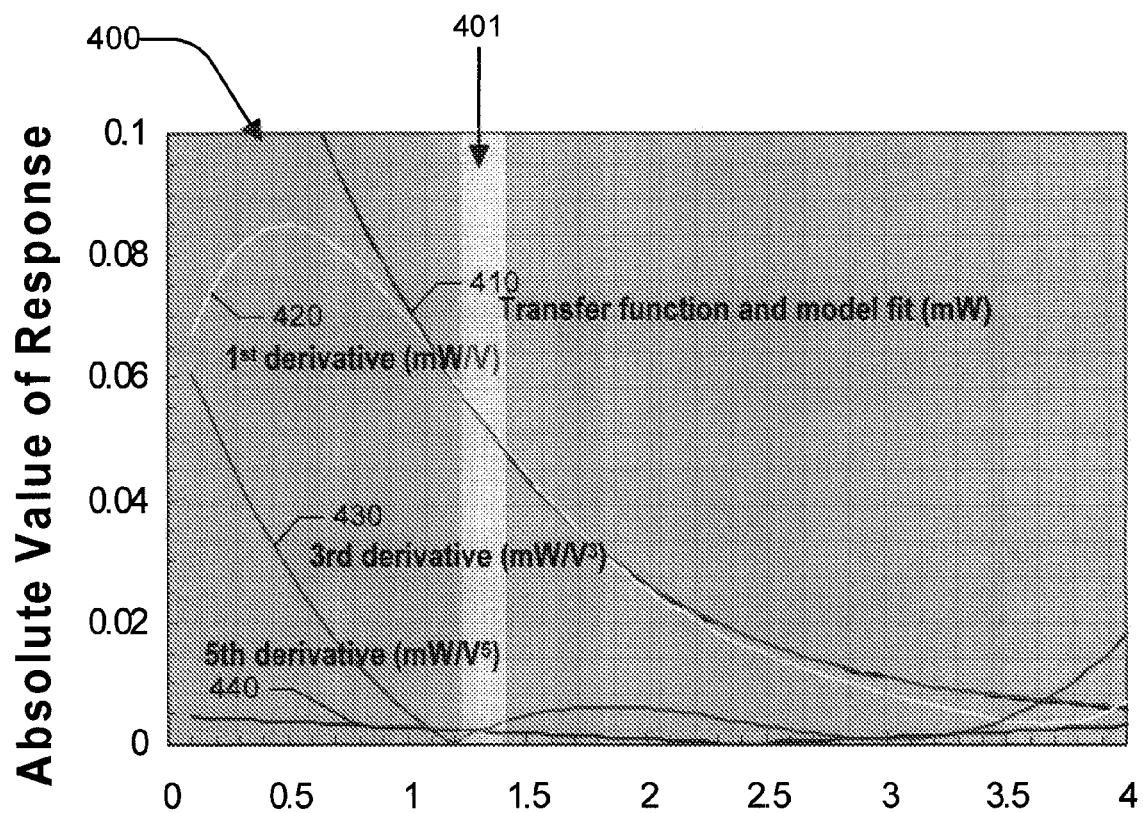
FIG. 4 shows a graph illustrating various traces generated by a computer algorithm as part of programmatically determining the optimal SFDR bias voltage for a first EAM sample having a first set of design parameters according to one aspect of the subject technology.

The determination of the optimal SFDR or gain bias voltage typically involves a computer program executing an algorithm configured to programmatically determine the optimal SFDR or gain bias voltage. FIG. 4 shows a graph illustrating various traces generated by a computer algorithm as part of programmatically determining the optimal SFDR bias voltage for a first EAM sample having a first set of design parameters according to one aspect of the subject technology. Table 1 shows various design parameters for the first EAM sample:

TABLE 1

Design Parameters for the First EAM Sample

| Layer (FIG. 2) | Material | Thickness (μm) | Doping |
|---|---|---|---|
| Electrode-bonding (148) | InGaAs | 0.04 | p 1 × $10^{19}$ |
| Upper confining (146) | InP | 1.04 | p 4 × $10^{17}$ |
| Transition (144) | InP | 0.15 | undoped |
| EA (142) | InGaAsP | 0.25~0.3 | undoped |
| Waveguide (120) | InGaAsP | 1.2 | n 1 × $10^{18}$ |
| Lower confining (115) | InP | 0.5~1.0 | n 1 × $10^{18}$ |
| Substrate (110) | InP | 350 +/− 25 | n 3 × $10^{18}$ |

The waveguide width 105 for the first EAM sample is 4.0 μm. The graph 400 shows a first measured trace 410 corresponding to an output versus bias voltage transfer curve for the first EAM sample, the generation of which is described above with respect to the state 320. The first trace 410 also includes a fit for the trace curve with a model function. The graph 400 also shows a second trace 420 corresponding to a first derivative of the fitted model function, a third trace 430 corresponding to a third derivative of the fitted model function, and a fourth trace 440 corresponding to a fifth derivative of the fitted model function. The graph 400 also shows a range of optimal bias voltages 401 (lightly shaded region) corresponding to the optimal SFDR voltage, which as described above, can include a range of bias voltages. The computer algorithm can determine the optimal SFDR voltage by programmatically determining a bias voltage or a range of bias voltages at which a sum of functions depending upon the third order derivative and the fifth order derivative is at a minimum value including a range of minimum values. Similarly, if an optimal gain voltage is to be determined, the computer program can programmatically determine a bias voltage or a range of bias voltages at which the first derivative 420 is at a maximum value including a range of maximum values.

Figure 5:
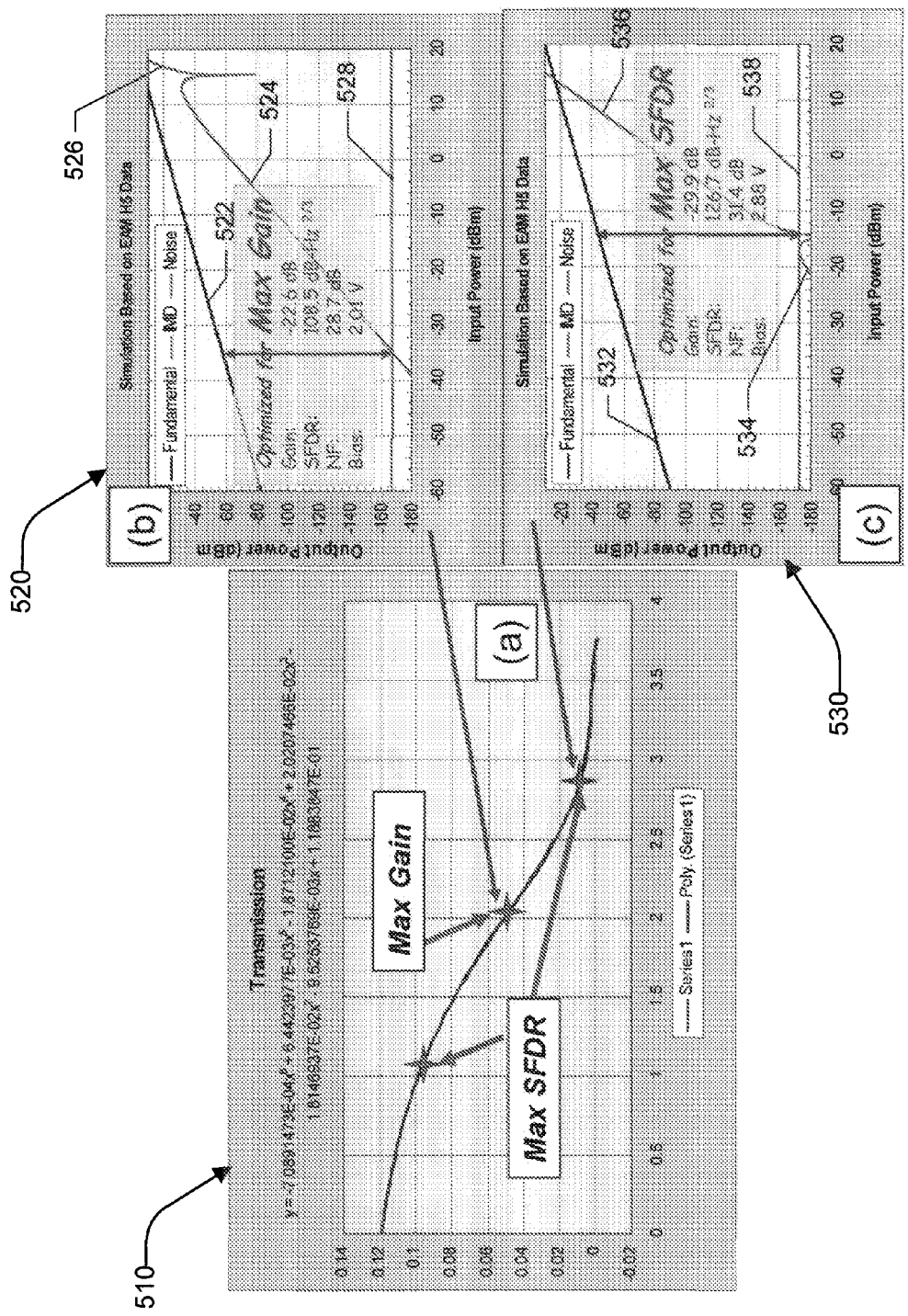
FIG. 5 shows graphs illustrating SFDR and gain performance for a second EAM sample having a second set of design parameters according to one aspect of the subject technology.

FIG. 5 shows graphs illustrating SFDR and gain performance for a second EAM samle having a second set of design parameters according to one aspect of the subject technology. Design parameters for the second EAM sample are shown in Table 2 provided below:

TABLE 2

Design Parameters for the Second EAM Sample

| Layer (FIG. 2) | Material | Thickness (μm) | Doping |
|---|---|---|---|
| Electrode-bonding (148) | InGaAs | 0.04 | p 1 × $10^{19}$ |
| Upper confining (146) | InP | 1.04 | p 4 × $10^{17}$ |
| Transition (144) | InP | 0.15 | undoped |
| EA (142) | InGaAsP | 0.275 | undoped |
| Spacer (NA) | InP | 0.01 | undoped |
| Waveguide (120) | InGaAsP | 1.2 | n 1 × $10^{18}$ |
| Lower confining (115) | InP | 0.5 | n 1 × $10^{18}$ |
| Substrate (110) | InP | 350 +/− 25 | n 3 × $10^{18}$ |

Note that in the second EAM sample, as compared to the first EAM sample, a transition layer has been introduced between the waveguide layer 120 and the EA layer 142. The waveguide width 105 is kept at 4.0 μm.

FIG. 5 shows a graph 510, denoted "(a)", illustrating a fitted model function associated with a measured transfer curve for the second EAM sample. In the illustrated example, the model function employed is a 6th-order polynomial equation having a plurality of variable coefficients that are used by the algorithm to fit the trace curve.

Returning now to FIG. 3, the process 300 proceeds to a state 340, in which a plurality of output versus input (e.g., an optical output power versus optical input power) response curves are simulated based at least in part on the fitted model function discussed above with respect to the graph 510. In this regard, FIG. 5 shows a graph 520, denoted "(b)", illustrating a plurality of simulated response curves for the second EAM sample optimized for the maximum gain. In the illustrated example, the simulated response curves include a fundamental response curve 522, a third-order intermodulation distortion (IMD) curve 524, a fifth-order IMD curve 526, and a noise baseline 528. These response curves correspond to the case in which the bias voltage for the EAM is set at the optimal gain voltage, which, in the illustrated example, is −2.01V. FIG. 5 also shows a graph 530, denoted "(c)", illustrating a plurality of simulated response curves for the second EAM sample optimized for the maximum SFDR The response curves include a fundamental response curve 532, a third-order intermodulation distortion (IMD) curve 534, a fifth-order IMD curve 536, and a noise baseline 538. These response curves correspond to the case in which the bias voltage is set at the optimal SFDR voltage, which, in the illustrated example, is −2.88V. This is determined from a family of simulated response curves, each member of which follows from a given bias voltage.

The process 300 proceeds to a state 350, in which the maximum gain or the maximum SFDR is evaluated from the set of simulated response curves. For example, if the link parameter sought to be maximized is the gain, the maximum gain is evaluated from the bias voltage that produces the maximum ratio of output to input power at the optical input power at which the third-order IMD curve 524 intersects the noise baseline 528. The SFDR is obtained by subtracting the noise baseline 528 from the fundamental response curve 522 at the intersection point as shown in the graph 520. In the illustrated example, the maximum gain thus evaluated from the simulated response curves is −22.6 dB. For this design, the SFDR (unoptimized) is 108.5 dB-Hz$^{2/3}$. On the other hand, if the link parameter sought to be maximized is the SFDR, a bias voltage for maximum SFDR, as in the state 350, is chosen from the family of response curves so that the maximum in the third-order curve 534 is tangent to the noise floor 538. The maximum SFDR is then measured from the intercept of that noise floor 538 with the 5$^{th}$ order curve 536 and the fundamental 532 as shown in the graph 530. In the illustrated example, the maximum SFDR thus evaluated from the simulated response curves is 126.7 dB-Hz$^{2/3}$. For this design, the gain (unoptimized) is −29.9 dB. As to be expected, the maximum gain is higher than the unoptimized gain, and the maximum SFDR is higher than the unoptimized SFDR.

The process 300 proceeds to an optional state 360, in which the simulated response curves obtained at the state 350 are confirmed by a two-tone measurement performed on the EAM with a proper bias. For example, if the link parameter sought to be maximized is the gain, the two-tone measurement is performed while the EAM is biased at the optimal gain bias point. On the other hand, if the link parameter sought to be maximized is the SFDR, the two-tone measurement is performed while the EAM is biased at the optimal SFDR bias point. The two-tone measurement was performed with the optical input power of 13 dBm into the input fiber and RF tones set at 4.999 and 5.0001 GHz.

Figure 6A:
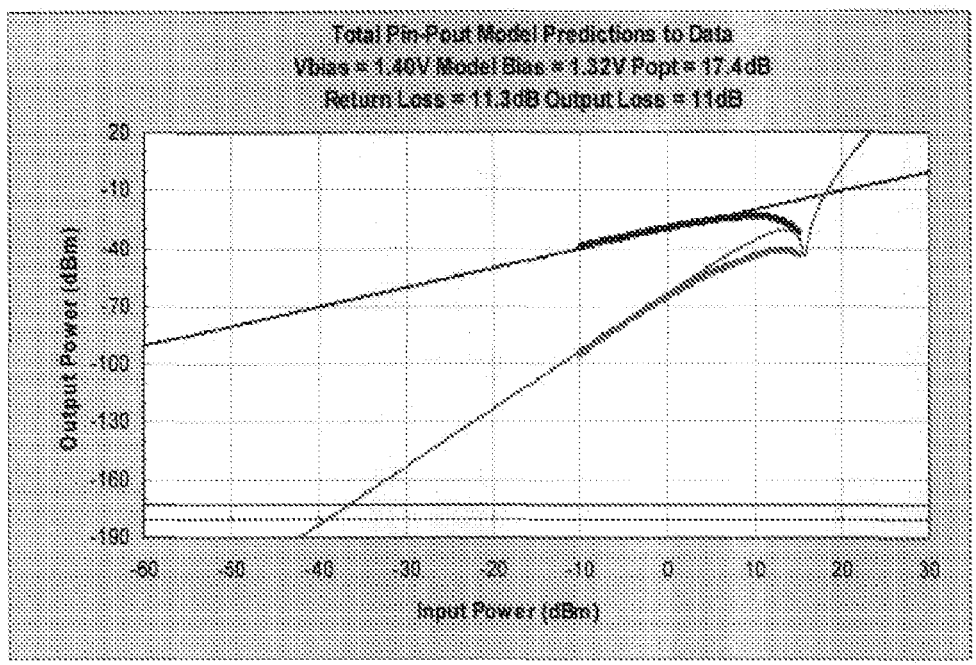
FIG. 6A shows a graph comparing simulated curves to data points obtained from a two-tone measurement performed on a third EAM sample having a third set of design parameter and optimized for the gain.

FIG. 6A shows a graph comparing simulated curves to data points obtained from a two-tone measurement performed on a third EAM sample having a third set of design parameter and optimized for the maximum gain. Design parameters for the third EAM sample are shown in Table 3 provided below:

TABLE 3

Design Parameter for the Third EAM Sample

| Layer (FIG. 2) | Material | Thickness (μm) | Doping |
|---|---|---|---|
| Electrode-bonding (148) | InGaAs | 0.04 | p 1 × 10$^{19}$ |
| Upper confining (146) | InP | 1 | p 4 × 10$^{17}$ |
| Transition (144) | InP | 0.025 | undoped |
| EA (142) | InGaAsP | 0.375 | undoped |
| Spacer (NA) | InP | 0.01 | undoped |
| Waveguide (120) | InGaAsP | 2 | n 1 × 10$^{18}$ |
| Lower confining (115) | InP | 0.5 | n 1 × 10$^{18}$ |
| Substrate (110) | InP | 350 +/− 25 | n 3 × 10$^{18}$ |

Figure 7:
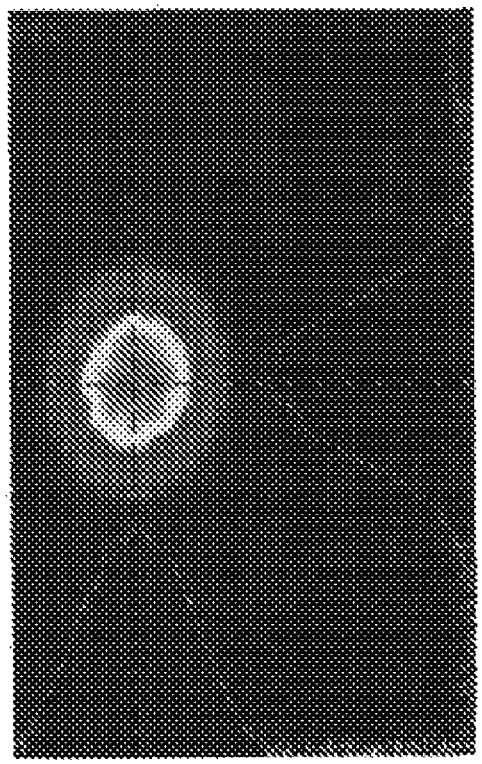
FIG. 7 is a measured mode profile for the third EAM sample.

Note that in the third EAM sample, as compared to the first and second EAM samples, the thicknesses of both the waveguide layer 120 and the EA layer 142 have been significantly increased, although the waveguide width 105 is kept at 4.0 μm. FIG. 7 is a measured mode profile for the third EAM sample. The vertical full width half maximum (FWHM) is determined to be 4.3 μm while the horizontal FWHM is determined to be 5.1 μm. It is worth noting that the optical mode for the third EAM sample is more circular and generally larger in size compared to the optical modes of the first and second EAM embodiments. Furthermore, the circularization and the mode size increase improved SFDRs as Table 4 provided below demonstrates:

TABLE 4

SFDR in dB in 1 Hz bandwidth for different EAM embodiments

| EAM Embodiment | 13dBm | 13dBm with Balance | 18dBm | 18dBm with Balance |
|---|---|---|---|---|
| 1 | NA | 119 | NA | NA |
| 2 | 119 | 127 | 124.5 | 130 |
| 3 | NA | 130 | 127.2 | 133 |

In addition, the circularization and the mode size increase result in an increase in the optical power handling capability of the EAM and an increase in the optical output power reaching the detector. The increase in the optical output power is attributable to a decrease in the EAM insertion loss brought about by matching the mode shape and size to those of the input and output fibers.

Figure 6B:
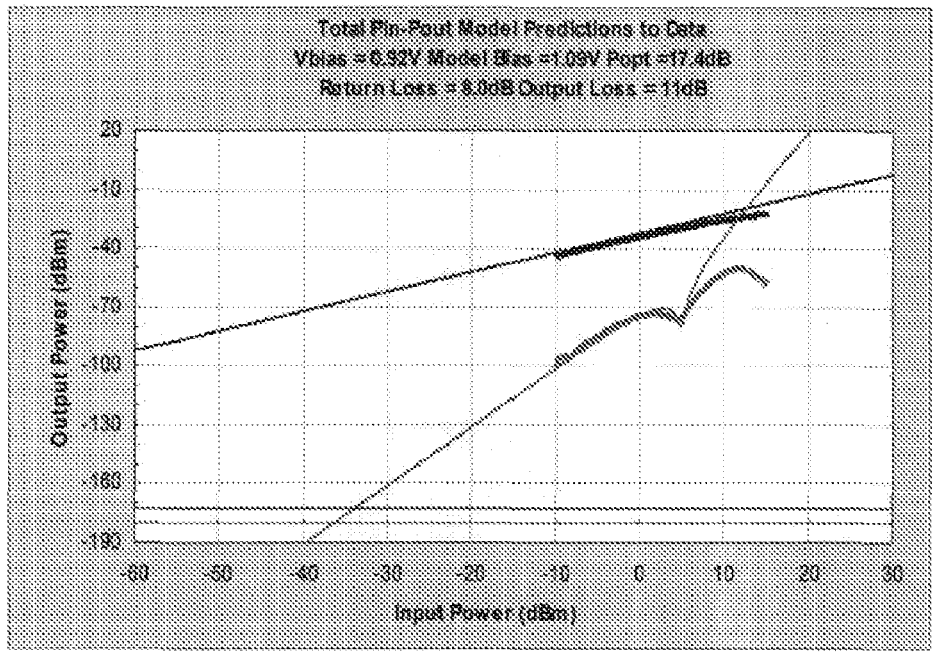
FIG. 6B shows a graph comparing simulated curves to data points obtained from a two-tone measurement performed on the third EAM sample having the third set of design parameter and optimized for the SFDR.

Returning now to FIG. 6A, the comparison shows that the simulated curves and the measured data points are in a good agreement in the regions of interest, e.g., where the maximum gain or the maximum SFDR are evaluated. FIG. 6B shows a graph comparing simulated curves to data points obtained from a two-tone measurement for the third EAM sample maximized for the SFDR. While the data points diverge from the simulated curves above the third-order to fifth-order IMD transition point, the location of the transition point is still accurately predicted from the simulated curves.

At this stage, depending on the maximum SFDR or the maximum gain obtained and confirmed from process described above, the designer or the computer algorithm may choose to end the design process 300 and adopt the set of design parameters and the optimal gain bias voltage or the optimal SFDR bias voltage, or repeat the process 300 with another set of design parameters. The process 300 may be repeated for a number of times with different sets of design parameters and a particular set that yields a largest possible maximum gain or SFDR can be chosen for the final design.

Figure 8:
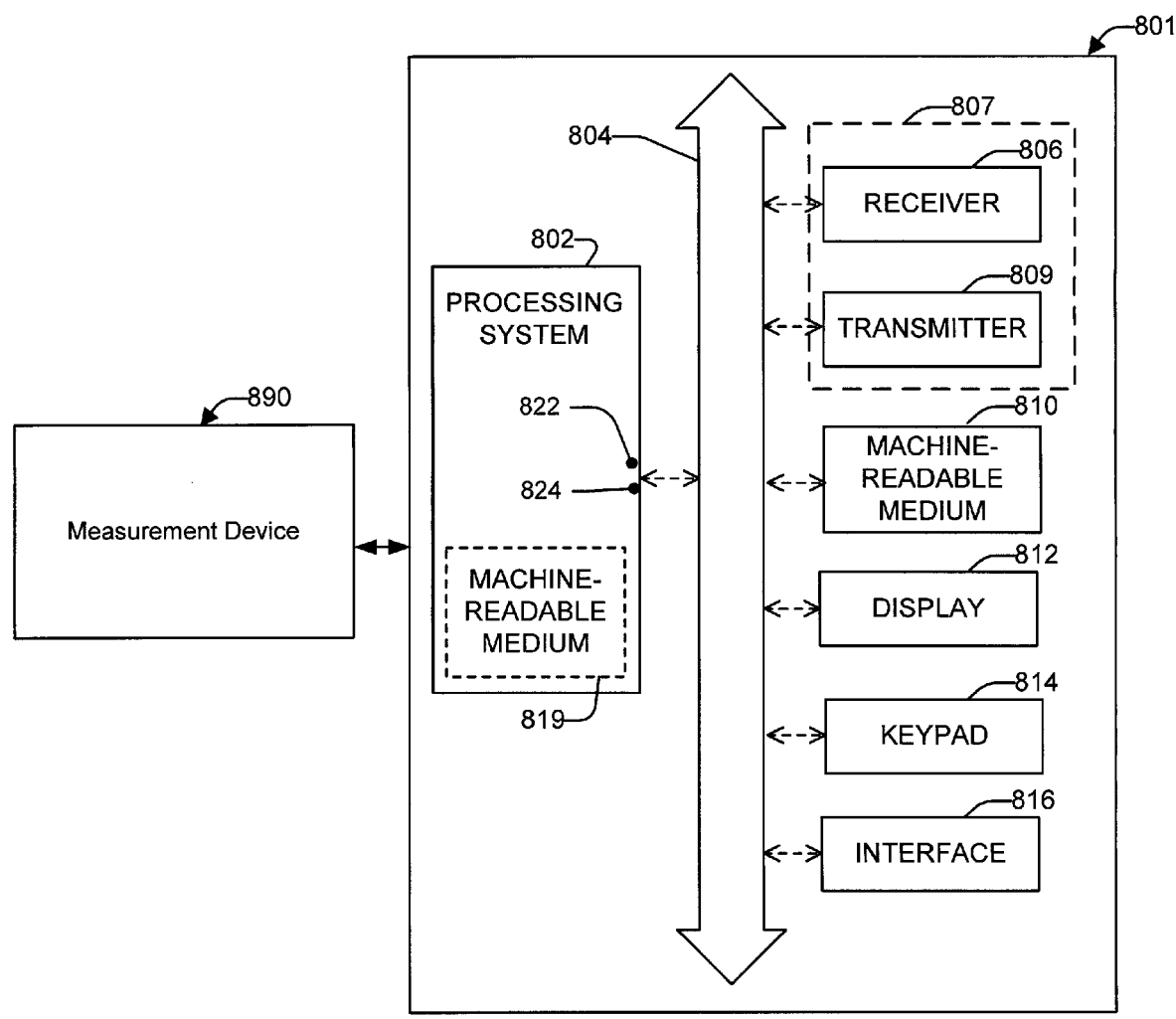
FIG. 8 is a conceptual block diagram illustrating an example of a system in which some aspects of the subject technology can be implemented.

FIG. 8 is a conceptual block diagram illustrating an example of a system 801 and a measurement device 890 in data communication with the system 801 in which various aspects of the subject technology can be implemented. The system 801 includes a processing system 802, which may be a desktop computer or a laptop computer. The processing system 802 is capable of communication with a receiver 806 and a transmitter 809 through a bus 804 or other structures or devices. It should be understood that communication means other than busses can be utilized with the disclosed configurations. The processing system 802 can generate audio, video, multimedia, and/or other types of data to be provided to the transmitter 809 for communication. In addition, audio, video, multimedia, and/or other types of data can be received at the receiver 806, and processed by the processing system 802.

The processing system 802 may include a general-purpose processor or a specific-purpose processor for executing instructions and may further include a machine-readable medium 819, such as a volatile or non-volatile memory, for storing data and/or instructions for software programs. The instructions, which may be stored in a machine-readable medium 810 and/or 819, may be executed by the processing system 802 to control and manage access to the various networks, as well as provide other communication and processing functions. The instructions may also include instructions executed by the processing system 802 for various user interface devices, such as a display 812 and a keypad 814. The processing system 802 may include an input port 822 and an output port 824. Each of the input port 822 and the output port 824 may include one or more ports. The input port 822 and the output port 824 may be the same port (e.g., a bi-directional port) or may be different ports.

The processing system 802 may be implemented using software, hardware, or a combination of both. By way of example, the processing system 802 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable device that can perform calculations or other manipulations of information.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 819) may include storage integrated into a processing system, such as might be the case with an ASIC. Machine-readable media (e.g., 810) may also include storage external to a processing system, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system 802. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions can be, for example, a computer program including code.

An interface 816 may be any type of interface and may reside between any of the components shown in FIG. 8. An interface 816 may also be, for example, an interface to the outside world (e.g., an Internet network interface). A functionality implemented in a processing system 802 may be implemented in a portion of a receiver 806, a portion of a transmitter 809, a portion of a machine-readable medium 810, a portion of a display 812, a portion of a keypad 814, or a portion of an interface 816, and vice versa. A transceiver block 807 may represent, for example, a wired or wireless computer interface between the system 801 and the measurement device 890.

Various aspects of the subject technology can be implemented in the system 801 and the measurement device 890. For example, the measurement for generating the output versus bias voltage transfer curve discussed above may be performed on the measurement device 890. The measurement device 890 may contain its own processor and computer readable medium which may store computer-executable instructions for some aspects of the subject technology. The transfer curves such as the ones shown in FIG. 4 and/or the response curves such as the ones shown in FIGS. 5 may be displayed on the display 812. In addition, the two-tone measurement discussed above may be performed in the measurement device 890. The programmatic determination of the optimal SFDR bias voltage or the optimal gain bias voltage, including the fitting of the transfer curve with a model function and taking first, third, and fifth derivatives, may be performed by the processing system 802 executing instructions stored in the machine readable medium 819 or the machine readable medium 810. In addition, the simulation of the response curves and the evaluation of the maximum SFDR or the maximum gain based on the simulated response curves may also be performed by the processing system 802 executing instructions stored in the machine readable medium 819 or the machine readable medium 810. Various design parameters such as various layer thicknesses may be stored in the computer readable medium 819, 810. Various optimized parameters such as the optimal SFDR bias voltage, the optimal gain bias voltage, the maximum SFDR value, and the maximum gain value may be stored in the computer readable medium 819, 810.

In one embodiment, various systems and methods of the present disclosure are implemented and performed with a PC, a modified LabVIEW software running on the PC, appropriate sensors, and a number of controlled voltage, laser and thermal sources.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of maximizing a spur-free dynamic range (SFDR) or a gain of an electro-absorption modulator (EAM), the method comprising:
   varying at least one parameter in a set of design parameters for an EAM, wherein an SFDR of the EAM is determined in part by a first set of design parameters, or a gain of the EAM is determined in part by a second set of design parameters;
   generating an output versus bias voltage transfer curve of the EAM; and
   programmatically determining an optimal SFDR bias voltage at which a maximum SFDR occurs for a given optical input power or an optimal gain bias voltage at which a maximum gain occurs for a given optical input power based at least in part on the transfer curve.

2. The method of claim 1, wherein the varying comprises changing the thickness of a waveguide layer of the EAM.

3. The method of claim 1, wherein the varying comprises changing an overall distance between two optically confining layers of the EAM.

4. The method of claim 1, wherein the varying comprises changing the thickness of an electroabsorption layer of the EAM.

5. The method of claim 1, wherein the varying comprises circularizing an optical mode so as to improve a coupling of the optical mode into input and output optical fibers.

6. The method of claim 1, wherein the varying comprises increasing a size of an optical mode so as to increase optical power handling capability of the EAM.

7. The method of claim 1, wherein the varying comprises changing an optical input power.

8. The method of claim 1, wherein the programmatically determining comprises programmatically determining an optimal SFDR bias voltage, without programmatically determining an optimal gain bias voltage.

9. The method of claim 8, wherein the programmatically determining the optimal SFDR bias voltage comprises:
   fitting the transfer curve with a model function;
   taking a third order derivative and a fifth order derivative of the fitted model function, and
   finding a bias voltage at which a sum of functions of the third order derivative and the fifth order derivative is at a minimum.

10. The method of claim 8 further comprising simulating a plurality of output versus input response curves based at least in part on the transfer curve, wherein the plurality of response curves comprise a fundamental response curve, a third-order intermodulation distortion (IMD) curve, and a fifth-order IMD curve.

11. The method of claim 10 further comprising evaluating the maximum SFDR based at least in part on the plurality of simulated response curves.

12. The method of claim 10 further comprising confirming the plurality of simulated response curves via a two-tone measurement performed on the EAM biased at the optimal SFDR bias voltage.

13. The method of claim 8 further comprising repeating the varying, the generating and the programmatically determining steps for different sets of design parameters and choosing a particular set that yields a largest maximum SFDR.

14. An electro-absorption modulator (EAM) having the largest maximum SFDR according to the method of claim 13.

15. The method of claim 1, wherein the programmatically determining comprises programmatically determining an optimal gain bias voltage, without programmatically determining an optimal SFDR bias voltage.

16. The method of claim 15, wherein the programmatically determining the optimal gain bias voltage comprises:
   fitting the transfer curve with a model function;
   taking a first order derivative of the fitted model function, and
   finding a bias voltage at which the first derivative is at a maximum.

17. The method of claim 15 further comprising simulating a plurality of output versus input response curves based at least in part on the transfer curve, wherein the plurality of response curves comprise a fundamental response curve, a first-order intermodulation distortion (IMD) curve, and a fifth-order IMD curve.

18. The method of claim 17 further comprising evaluating the maximum gain based at least in part on the plurality of simulated response curves.

19. The method of claim 17 further comprising repeating the varying, the generating and the programmatically determining steps for different sets of design parameters and choosing a particular set that yields a largest maximum gain.

20. The method of claim 1 further comprising building an EAM based on the set of design parameters.

* * * * *